United States Patent
D'Ercoli

(10) Patent No.: US 10,826,715 B2
(45) Date of Patent: Nov. 3, 2020

(54) SIMPLE DEVICE REPLACEMENT IN A PROFINET IO CONFORMANCE CLASS A (CCA) NETWORK THROUGH UBIQUITOUS COMPUTING PARADIGM AND COMBINING A TOKEN RING APPROACH WITH A UBICOMP PARADIGM TO PREVENT REAL-TIME PERFORMANCE DROP

(71) Applicant: Datalogic IP Tech S.R.L., Bologna (IT)

(72) Inventor: Francesco D'Ercoli, Bologna (IT)

(73) Assignee: Datalogic IP Tech S.R.L., Calderara di Reno (IT)

(*) Notice: Subject to any disclaimer, the term of this patent is extended or adjusted under 35 U.S.C. 154(b) by 0 days.

(21) Appl. No.: 15/368,137

(22) Filed: Dec. 2, 2016

(65) Prior Publication Data

US 2018/0159739 A1  Jun. 7, 2018

(51) Int. Cl.
| | |
|---|---|
| H04L 12/18 | (2006.01) |
| H04L 12/24 | (2006.01) |
| H04L 12/26 | (2006.01) |
| H04L 12/433 | (2006.01) |
| H04L 12/417 | (2006.01) |

(52) U.S. Cl.
CPC .......... H04L 12/18 (2013.01); H04L 41/0816 (2013.01); H04L 12/417 (2013.01); H04L 12/433 (2013.01); H04L 41/0846 (2013.01); H04L 41/0853 (2013.01)

(58) Field of Classification Search
None
See application file for complete search history.

(56) References Cited

U.S. PATENT DOCUMENTS

| 5,077,732 A | 12/1991 | Fischer et al. |
| 2003/0037033 A1* | 2/2003 | Nyman ............. H04L 29/12264 |

(Continued)

FOREIGN PATENT DOCUMENTS

| EP | 1137227 A2 | 9/2001 |
| EP | 2678973 A1 | 1/2014 |

OTHER PUBLICATIONS

"Profinet System Description—Technology and Application," Version Jun. 2011, Profibus Nutzeroganisation, Germany, 19 pgs.

(Continued)

*Primary Examiner* — Ruihua Zhang
(74) *Attorney, Agent, or Firm* — Foley & Lardner LLP

(57) ABSTRACT

Simple device replacement (SDR), low-cost class A compatible devices that store and use configuration tables for use in performing a node replacement may be used. The use of SDR using 802.3 Ethernet-enabled class A devices allows for dispensing with an external management computer or device-mounted additional hardware (e.g., push-button, SD card, etc.), and for performing node replacement while the network remains operating. A modified token ring or logical ring configuration and process may also be utilized. In an embodiment, a logical ring with a token, which may be used as a distributed scheduler that is circulated amongst network nodes, may be provided. The use of a modified token ring may provide for managing low-priority traffic on an 802.3 network for sensors to utilize low-priority communications without impacting high-priority communications.

33 Claims, 10 Drawing Sheets

(56) References Cited

U.S. PATENT DOCUMENTS

| | | | |
|---|---|---|---|
| 2005/0157543 A1* | 7/2005 | Masuda | G05B 19/056 |
| | | | 365/158 |
| 2008/0216052 A1* | 9/2008 | Hejlsberg | G06F 9/4488 |
| | | | 717/114 |
| 2012/0215874 A1* | 8/2012 | Sequeira | H04L 12/12 |
| | | | 709/208 |
| 2015/0169351 A1 | 6/2015 | Song | |
| 2015/0222695 A1* | 8/2015 | Lee | H04L 61/103 |
| | | | 709/201 |
| 2015/0271019 A1 | 9/2015 | Reich et al. | |
| 2016/0057009 A1* | 2/2016 | Kadayam | G06F 11/2069 |
| | | | 709/221 |
| 2018/0097882 A1* | 4/2018 | Mu | H04L 67/1097 |

OTHER PUBLICATIONS

"Profinet Design Guideline," Version 1.04, Nov. 2010, Profibus Nutzeroganisation, Germany, pp. 1-192.

"Ubiquitous computing," —Wikipedia, https://en.wikipedia.org/wiki/Ubiquitous_computing, pulled from the internet on Dec. 2, 2016, pp. 1-7.

"Pervasive Computing," IEEE Pervasive Computing—IEEECS, (https://www.computer.org/pervasive-computing), pulled from the internet on Dec. 2, 2016, pp. 1-6.

Extended European Search Report corresponding to EP17205048.6, dated Jul. 18, 2018, 24 pages.

\* cited by examiner

SIMPLE DEVICE REPLACEMENT IN A PROFINET IO CONFORMANCE CLASS A (CCA) NETWORK THROUGH UBIQUITOUS COMPUTING PARADIGM AND COMBINING A TOKEN RING APPROACH WITH A UBICOMP PARADIGM TO PREVENT REAL-TIME PERFORMANCE DROP

BACKGROUND

Simple Device Replacement

Industrial Ethernet communications systems using the IEEE 802.3 communications protocol (Low Cost Ethernet), such as Profinet, are popular for supporting communications between nodes, such as computers, printers, scanners, and other office and industrial equipment. As with any system, there is a desire to improve efficiency. One such efficiency improvement is the ability to identify and substitute faulty devices. A protocol for performing what is known as "Simple Device Replacement" (SDR) is a feature currently available in a version of 802.3 Profinet IO Class B, but requires additional hardware, which is costly, complex, and time consuming to install. In particular, SDR is available for Profinet IO for Conformance Class B (CCB) IO Devices only in order to simplify an on-field device replacement procedure. Low-cost devices are not currently available with the Class B configuration. By using SDR, when a field device fails in a known topology, the device may be replaced without the use of a PC-based engineering tool (e.g., TIA Portal by Siemens).

As understood, when a device is to be replaced, a new device to be installed at a given position in the network topology receives the same Device Name as its predecessor. With the expected name, all of the configuration parameters are sent to the new node from an IO Controller. To make the replacement node possible, CCB IO Devices have to include functions for additional network diagnostics and for topology detection by integrating a set of specialized protocols, including (i) SNMP (Simple Network Management Protocol), MIB2 (Management Information Base 2) and (ii) LLDP-EXT MIB (Link Layer Discovery Protocol-MIB).

It is well known that Conformance Class A (CCA) IO Devices, which makes up the majority of single Ethernet-port devices, cannot offer the Simple Device Replacement feature. SDR is becoming very popular with users because of the ability to replace an IO Device on a Profinet IO network without using a network management computer, addressing a rotary-switch, pushing a button, or using any dedicated hardware (e.g. SD card), none of which is practical or economical. As is understood, customers do not even want to connect to a remote host server outside the Profinet IO network because such a connection is often prohibited or simply impossible in an industrial automation environment for both safety and privacy reasons. Furthermore, customers want to perform "configuration job" (i.e., replace a device or node) while the network continues to operate the entire time so as to maintain network availability for users.

Managing Bandwidth on an Ethernet Network

Soft real-time (soft-RT) fieldbus for non-isochronous applications, such as Profinet-RT and Ethernet/IP, are becoming increasingly common in communication networks in which typical Auto ID devices operate, especially 2D imagers and other sensing devices. One of the main reasons for the growing success of these fieldbus is that these networks are based on the low-cost Ethernet (IEEE 802.3), which is a standard communications protocol that is non-proprietary and is interoperable with leading IT world standard protocols (HTTP, TCP/IP, FTP, e-Mail, XML, VoIP, etc.), and which are essential to achieve service levels required by customers. In other words, fieldbusses may support both real-time traffic (typical of control systems: high-priority traffic) and non-real-time or best effort traffic (information: low-priority traffic).

On the other hand, modern vision systems tend to be smarter and distributed, capable of storing, processing, and transmitting large and increasing amounts of non-real-time information (e.g. images of the scene) on networks. Fieldbusses are typically imposed by an Auto ID customer, and heterogeneous sensors and actuators that have nothing to do with the vision system can coexist. As a result, a paradoxical situation exists as available bandwidth is nominally high (e.g., for Profinet IO up to 100 Mbps: Fast Ethernet), but indiscriminate use of the nodes, such as transmitting large information (e.g., images and video) may be from several nodes at the same time to a host node inside or outside of the network, can interfere heavily on the performance of the other nodes in the network that are not part of the vision system (PLC, sensors, and actuators).

Computer Science is experimenting with new approaches to ubiquitous computing (UBICOMP), which includes adding intelligence not only in devices, but also to the environment. In the case of industrial automation, intelligence may be distributed in the network without delegating the intelligence to a server or to a human-machine interface.

As a specific example, imaging systems, such as 2D and 3D readers, are often connected in an industrial network as nodes on the network. Practically, in the IEEE 802.3 standards, two basic types of network traffic exist, including (i) high-priority traffic, which includes data communication necessary to the operation of different devices operating on the network, and (ii) low-priority traffic, which data communication that occurs only when the channel has sufficient available bandwidth. Two-dimensional (2D) readers and other devices make a lot of low-priority traffic, such as images and videos. However, low-priority traffic in the form of images and videos drain a significant portion of available network bandwidth, which potentially reduces the high-priority bandwidth available for other nodes (e.g., sensors) in the network that do not rely on image and video information to operate. As an example, two 5 Mpixel 2D sensors already could easily saturate the recommended bandwidth according to standard recommendations.

In order to relieve processing constraints the main computing nodes and free more bandwidth on a network, available computing power in the network should be distributed. One current solution has been to place devices that routinely exchange high volumes of data close enough in the network so as to minimize cluttering communications across the entirety of the network. Another solution has been to use a Class C or CC-C Profinet, which is not cost effective. Without solving the problem of communicating low-priority traffic, such as image and video data, over an IEEE 802.3 Ethernet network, a delay in the real-time response of devices results. Hence, there is a need to solve the problem of high-priority and low-priority traffic without using existing IEEE 802.3 network solutions, which are complex and expensive.

SUMMARY

Simple Device Replacement

To provide for performing simple device replacement (SDR), low-cost class A compatible devices that store and use configuration tables for use in performing a node replacement may be used. The use of SDR using 802.3 Ethernet-enabled class A devices allows for dispensing with an external management computer or device-mounted additional hardware (e.g., push-button, SD card, etc.), and for performing node replacement while the network remains operating.

In an embodiment, each node on an Ethernet may store a configuration table inclusive of configuration information of each of the other devices (nodes) on the network, but the configuration information may define a difference with respect to a standard configuration common to all devices on the network. In fact, storing the difference configuration saves memory space such that the limited available memory of each single device is not exhausted. In an embodiment, memory space in each device may be further reduced if a whole difference configuration file is retrieved from a network programmable logic controller (PLC), while each of the devices may store an identifier of the position in the network of the substituted device. Although the system and methodologies described herein provide for simple device replacement on 802.3 class A devices, the system and processes may also be compatible with 802.3 class B devices, although the principles provided herein enable simplification of the network configuration with respect to the standardized simple device replacement on 802.3 class B devices. The use of SDR described herein provides for the network to be automatically reconfigured as a node is replaced with a new node.

A system and method for replacing a node on an Ethernet network may include storing a network address and a node name associated with each node in a configuration table by each node of the Ethernet network. A new node added to the network may communicate a notification message onto the network to enable each of the nodes on the network to receive the notification message. The new node may receive, from each of the nodes on the network that received the notification message, a response message to the notification message. The response messages may include respective configuration tables. The new node may determine which node the new node has replaced by identifying an identifier associated with the replaced node that is missing from a set of node identifiers listed in at least one configuration table received in the response messages. A configuration table may be populated by the new node, where the configuration table may include (i) each of the network addresses and node names of the nodes that responded to the response message, and (ii) network addresses of the new node in association with a node name of the replaced node. An update message may be communicated to each of the network nodes that sent a response message to enable each of the network nodes to update respective configuration tables being stored thereat.

One embodiment of an Ethernet-enabled node may include a memory unit, an input/output (I/O) unit configured to communicate over an Ethernet network, and a processing unit in communication with the memory unit and the I/O unit. The processing unit may be configured to store a network address and a node name of the network-enabled node. A notification message may be communicated onto the Ethernet network to enable each other node on the network to receive the notification message, the notification message include a network address of the Ethernet-enabled node. A response message may be received from each of the other nodes on the network that received the notification message, where the respective response messages may include a configuration table and network address from each of the nodes on the network. A determine as to which node the Ethernet-enabled node has replaced by identifying an identifier associated with a node missing from the response messages based on at least one configuration table received in the response messages. A configuration table may be populated by including (i) each of the network addresses and node names of the nodes that responded to the notification message and (ii) network address of the Ethernet-enabled node in associate with a node name of the replaced node. An update message may be communicated to each of the network nodes that sent a response message to enable each of the network nodes to update respective configuration tables being stored thereat.

Managing Bandwidth on an Ethernet Network

To alleviate bandwidth constraints on an IEEE 802.3 Ethernet network using a low-cost and simplistic technique, a modified token ring or logical ring configuration and process may be utilized. In an embodiment, a "token" may be used as a distributed scheduler that is circulated amongst network nodes. The use of a modified token ring approach also allows (i) to more efficiently balance data transmission loads between different nodes, and (ii) to quickly detect a disconnection of a node and so as to adapt the system accordingly. Moreover, the use of a modified token ring to manage low-priority traffic on an 802.3 network may provide for sensors to utilize low-priority communications without impacting high-priority communications.

One embodiment of a method for managing communications on an Ethernet network may include broadcasting, by nodes on the network, "HELLO" messages inclusive of respective unique network addresses (e.g., media access control addresses, or MAC addresses) to other nodes operating on the network. In response to receiving the broadcast "HELLO" message, each other respective node on the network may store unique network addresses associated with the received "HELLO" messages within a token data structure. Each of the respective token network nodes (i) establishing the unique network addresses in the same order in the respective token data structures, and (ii) setting a token active value for the same network address in each of the respective token data structures to identify a network node as having a token. In response to a network node being identified as having a token, the network node identified as having the token may starting a timer during which best effort traffic is to be communicated on the network by the network node identified as having the token. The network node identified as having the token communicating best effort traffic on the network until the timer reaches a final time, resetting the token active value being stored in the token data structure, setting a token active value of a next network address listed in the data structure to identify a next network node to have the token, and communicating the updated token data structure to each of the other nodes on the network. Each of the starting, communicating, resetting, setting, and communicating may be repeated by each successive node identified as having the token.

An embodiment of an Ethernet-enabled node may include a memory unit, an input/output (I/O) unit configured to communicate over an Ethernet network, and a processing unit in communication with said memory unit and said I/O unit. The node may be configured to broadcast a "HELLO" message inclusive of a unique network address to other nodes operating on the network, where the "HELLO" message may cause the other nodes on the network to store the unique network address associated with the received "HELLO" message within a token data structure. A "HELLO" message inclusive of unique network addresses may be received from other nodes operating on the network. The "HELLO" messages may each include a unique network address of the respective network nodes that communicated the "HELLO" messages. The unique network addresses may be established in the same order as other nodes on the network in the respective token data structures. A token active value for the same network address in each of the respective token data structures may be set to identify a network node as having a token. In response to being identified as having a token, a timer may be started during which best effort traffic is to be communicated on the network. Best effort traffic may be communicated on the network until the timer reaches a final time. The token active value being stored in the token data structure may be reset, and a token active value of a next network address listed in the data structure may be set to identify a next network node to have the token. The updated token data structure may be communicated to each of the other nodes on the network.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Simple Device Replacement

Figure 1:
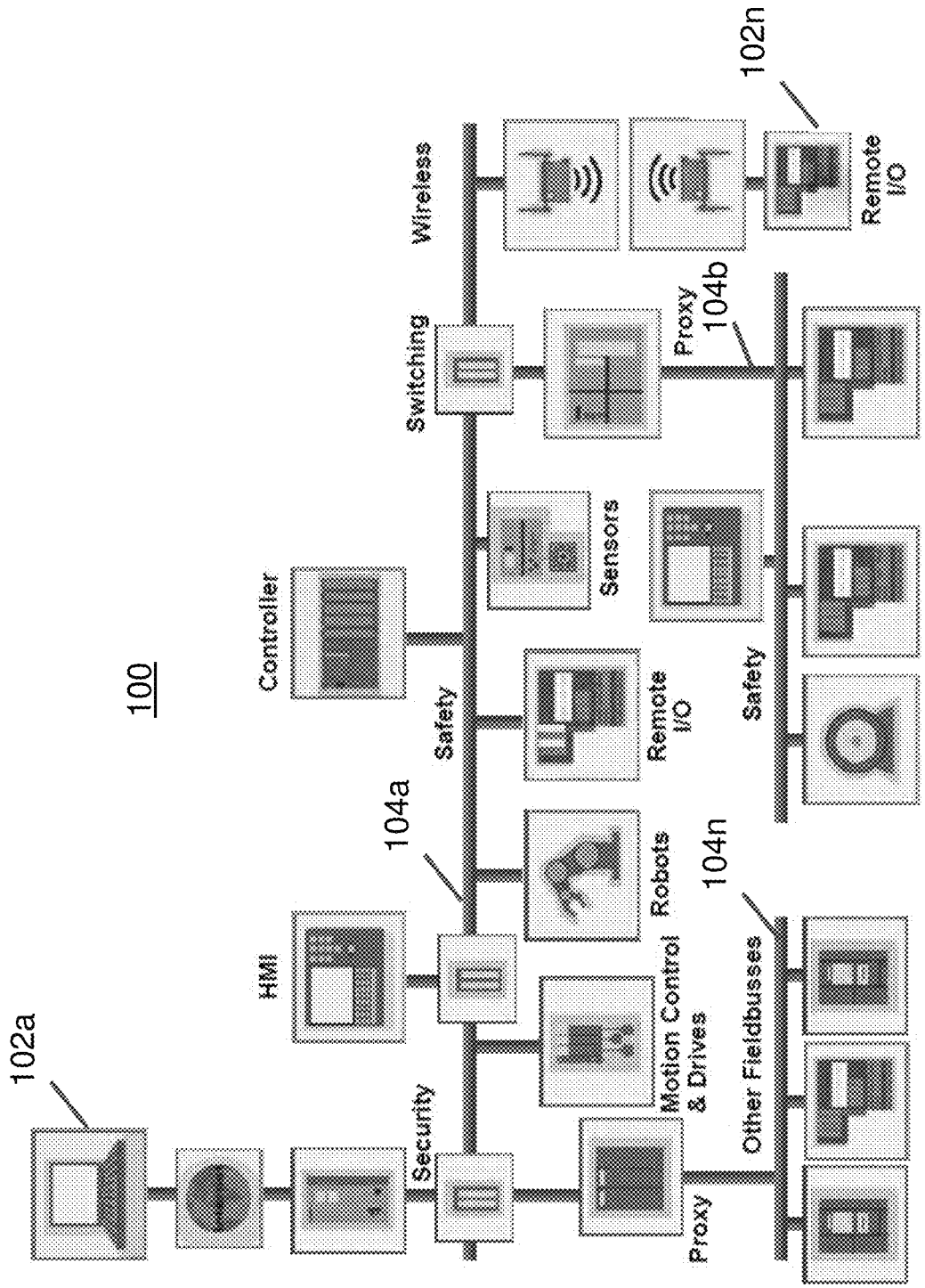
FIG. 1 is an illustration of an illustrative IEEE 802.3 communications network in which (i) simple device replacement for IEEE 802.3 Conformance Class A (CCA) devices and (ii) bandwidth management using modified token ring processes may be employed.

With regard to FIG. 1, an illustration of an illustrative IEEE 802.3 communications network 100 is shown. The network 100 may include devices or nodes 102a-102n (collectively 102) on which computers, I/O devices, scanners, robots, sensors, and a wide range of other business and industrial devices may operate. As shown, the network 100 may include a number of sub-networks 104a-104n (collectively 104), such as safety, proxy, and other fieldbusses. The different sub-networks 104 may support equipment that perform different functionality, be geographically separated, or for a variety of other reasons.

To provide for the ability to perform simple device replacement on an IEEE 802.3 communications network, such as a Profinet IO network, for Conformance Class A (CCA) IO Devices, a process including a Ubiquitous Computing (UBICOMP) paradigm may be utilized. The process may be considered a special case of a general "on the fly" or dynamic network reconfiguration procedure. By adopting the UBICOMP paradigm, data integration and spontaneous interoperation between nodes on the network may be established. Practically, each node 102 of the network may be configured to determine and/or store a whole or subset of each other node on the network 100, and may be configured to communicate network information to the other network nodes on the network utilizing a peer-to-peer networking communication protocol rather than a client-server communication protocol. Despite that an entire configuration of a node (e.g., 10 device) can occupy a lot of memory, such a node configuration is not a problem if the saved configuration is a difference between a current and well-known default, where a configuration subset or difference configuration table may be called CONFIG_DELTA, and be limited to 10 to 20 parameters, for example.

To correspond with the SDR feature in Profinet IO, a difference configuration table (CONFIG_DELTA) may save the Device Name because an IO Controller already has a dedicated mechanism to send the expected configuration to a IO Device (recognized by Device Name) on network event, such as cable plug/unplug and power-cycle. A network configuration table or configuration table may be called CONFIG_DELTA_ARRAY, and is simply a Device Name Table that establishes a link between a network address, such as a MAC address, on the network and a corresponding (expected) Device Name. In an embodiment, the network configuration table (CONFIG_DELTA_ARRAY) may associate each MAC address and Device Name of corresponding nodes on the network in each row of the table.

With regard to FIGS. 2A-2E, illustrations of an illustrative IEEE 802.3 network 200 on which a set of compatible devices or nodes 202a-202c (collectively 202) are operating and configured to perform a device replacement are shown. With regard to FIG. 2A, the devices 202 may be Class A devices. Other class devices may also be configured to operate using the SDR processes described herein. Each of the devices 202 may include respective memories 204a-204c (collectively 204) in which a configuration table (e.g., CONFIG_DELTA_ARRAY) 206 may be stored. An IO Controller, generally a programmable logic controller (PLC) 208, may operate on the network 200a to maintain communications over the communications bus 210. When the network 200a, such as the Profinet IO, is operating, cyclic data is exchanged between an IO Controller and multiple devices 202, such as Conformance Class A IO Devices.

As a precondition, each of the devices 202 on the network may start from a known, default configuration (e.g., default Device Name="NULL") that may be changed by using an engineering tool, such as an IO Controller engineering tool (e.g., by using the GSDML file), prior to the devices 202 replacing other devices or otherwise being added the network. It should be understood that at least two nodes are to be on the network for SDR to be used, otherwise, the network would just be a standalone device.

As a first step, once an IO Controller engineering tool configuration process is completed to establish the devices 202 on the network 200, each of the devices 202 may communicate (not shown) a difference or delta configuration table (e.g., CONFIG_DELTA, not shown) to each of the other devices 202 on the network 200 by using a multicast communication. The devices or nodes 202 shown have device names "IO-Device-1," "IO-Device-2," and IO-Device-3" with respective network addresses "MAC xxx A3," "MAC xxx BF," and "MAC xxx 24." Each of the devices 202 that receive the delta configuration tables, which may include both network address and name of the respective devices 202a, 202b, and 202c, from the other devices may store the received delta configuration table (CONFIG_DELTA) in a configuration table 206a (e.g., CONFIG_DELTA_ARRAY), thereby enabling each of the devices 202 to know the device names and network addresses of the devices 202 on the network 200.

Figure 2A:
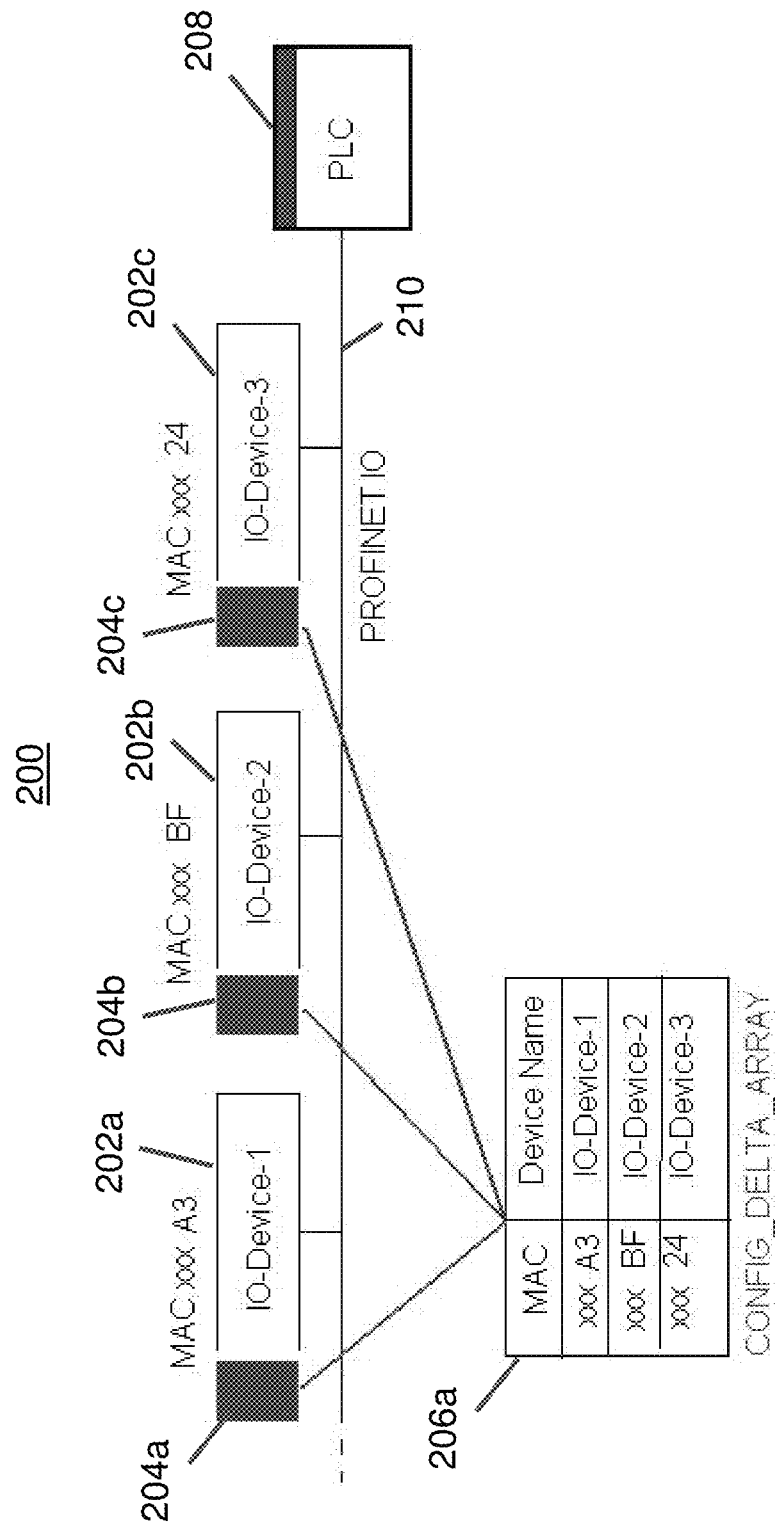
FIGS. 2A-2E are illustrations of an illustrative IEEE 802.3 network on which a set of compatible devices or nodes are operating to perform simple device replacement for CCA nodes.
Figure 2B:
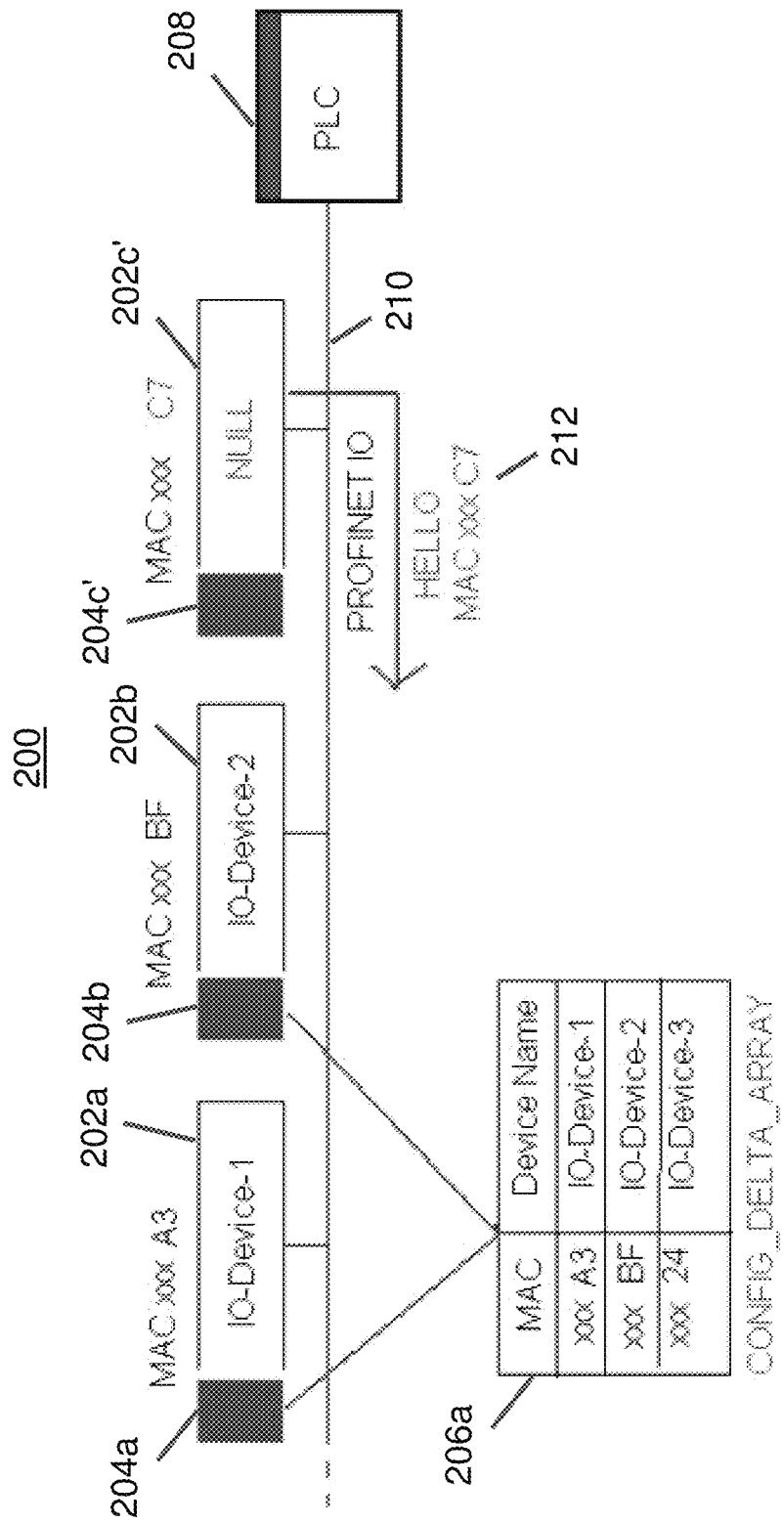

With regard to FIG. 2B, when a node, in this case device 202c, is replaced with a replacement device 202c', an automatic discovery procedure may be started when the new device 202c' is powered on the network 200. As shown, the new device 202c' may be configured with an initial device name of "NULL" and new network address, in this case "MAC xxx C7." In operation, the new device 202c' may communicate a multicast notification (e.g., "HELLO" message) 212 onto the bus 210 of the network 200 so that each of the other devices, in this case devices 202a and 202b, may receive the message 212. It is noted that the devices 202a and 202b at this point are still storing the configuration table 206a, which may be identical, as established in FIG. 2A as the devices have not yet updated the respective configuration table 206a as stored in memories 204a and 204b.

Figure 2C:
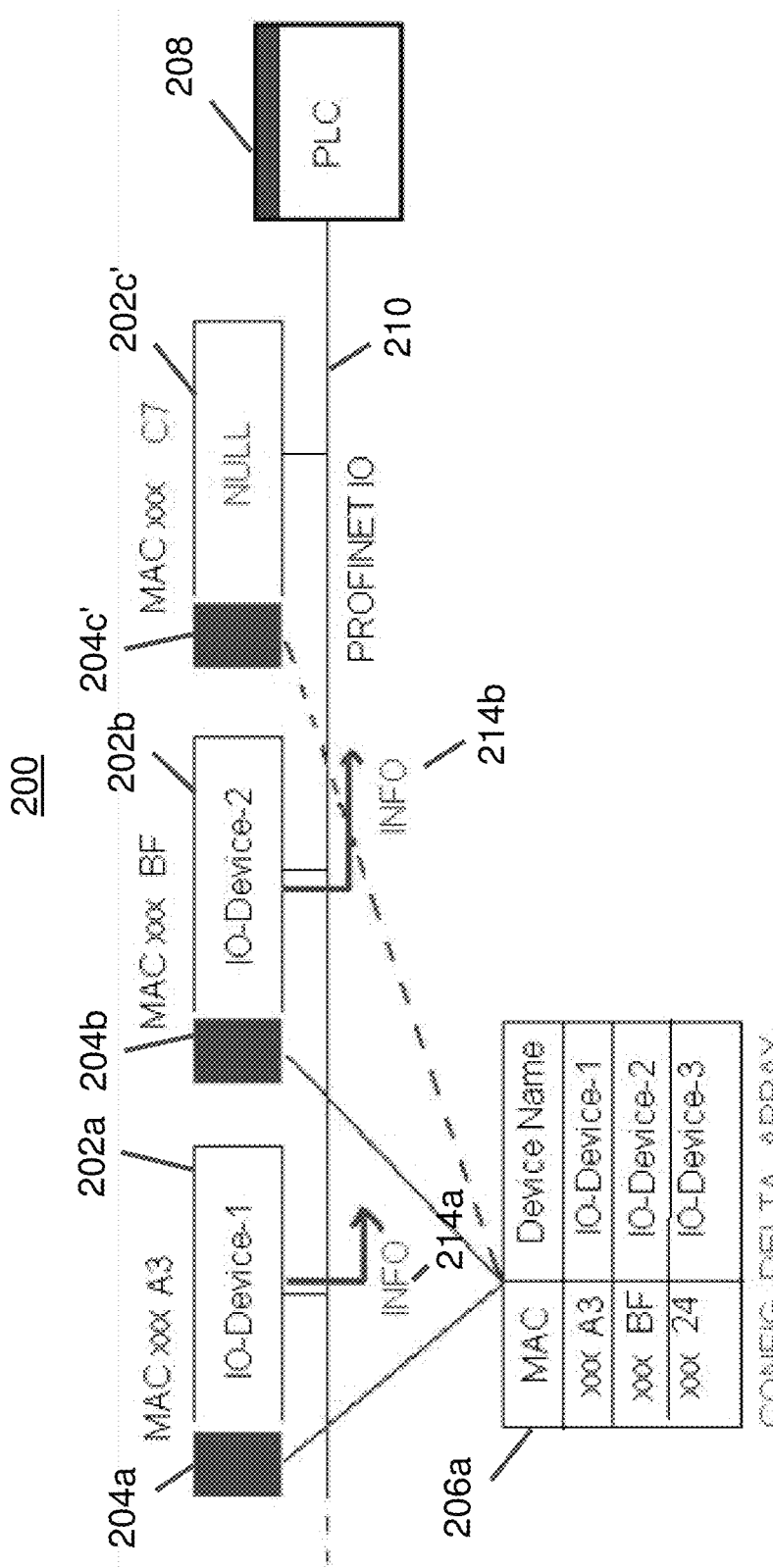

With regard to FIG. 2C, in response to the "HELLO" message 212 of FIG. 2B being received by the other nodes 202a and 202b, the other nodes 202a and 202b may respond by communicating "INFO" messages 214a and 214b back to the new node 202c' using a unicast communication message protocol. In an embodiment, the "INFO" messages 214a and 214b may include the configuration table CONFIG_DELTA_ARRAY 206. As understood in the art, messages communicated using the unicast communication message protocol include network addresses of the communicating network node, in this case nodes 202a and 202b.

Figure 2D:
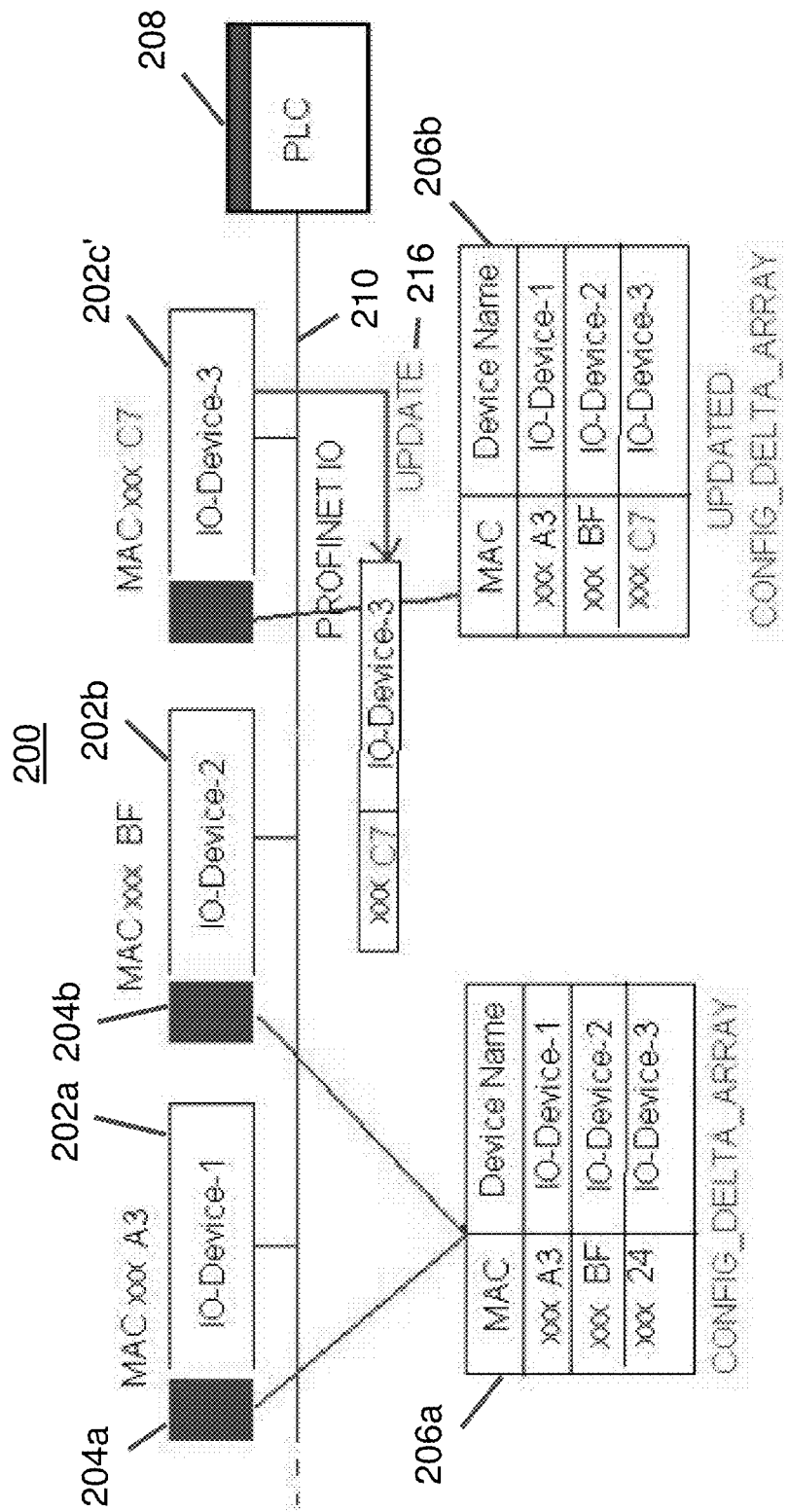

With regard to FIG. 2D, in an embodiment, in response to the new (replacement) node 202c' receiving the configuration tables 206a from each of the other nodes 202a and 202b, the new node 202c' may determine its CONFIG_DELTA data by analyzing the received configuration tables 206a (i.e., the CONFIG_DELTA_ARRAY) by searching for a missing correspondence between received MAC addresses (collected from "INFO" messages) and already stored MAC addresses. That is, each of the MAC addresses, "MAC xxx A3" and "MAC xxx BF," of nodes 202a and 202b are included in the configuration table 206a, but MAC address "MAC xxx 24" is not received with any "INFO" message. As a result, the new node 202c' may determine that the node being replaced was "MAC xxx 24." Once the new node 202c' determines the network address being replaced, a determination of the associated Device Name, in this case "IO-Device-3," may be made by the new node 202c'. By the new node 202c' determining its Device Name based on the received configuration tables, the new node 202c' may set and store its Device Name, in this case "IO-Device-3," in a CONFIG_DELTA table. The new node 202c' may thereafter communicate an "UPDATE" message 216 using a multicast communication message protocol to the other nodes 202a and 202b on the network 200. The "UPDATE" message 216 may include the CONFIG_DELTA table (e.g., network address and device name), in this case.

It should be understood that each of the nodes 202 may be configured with software engines to generate and communicate "HELLO" messages, "INFO" messages, and "UPDATE" messages to store CONFIG_DELTA and CONFIG_DELTA_ARRAY data structures, and to support configuration management processes using the data structures.

Figure 2E:
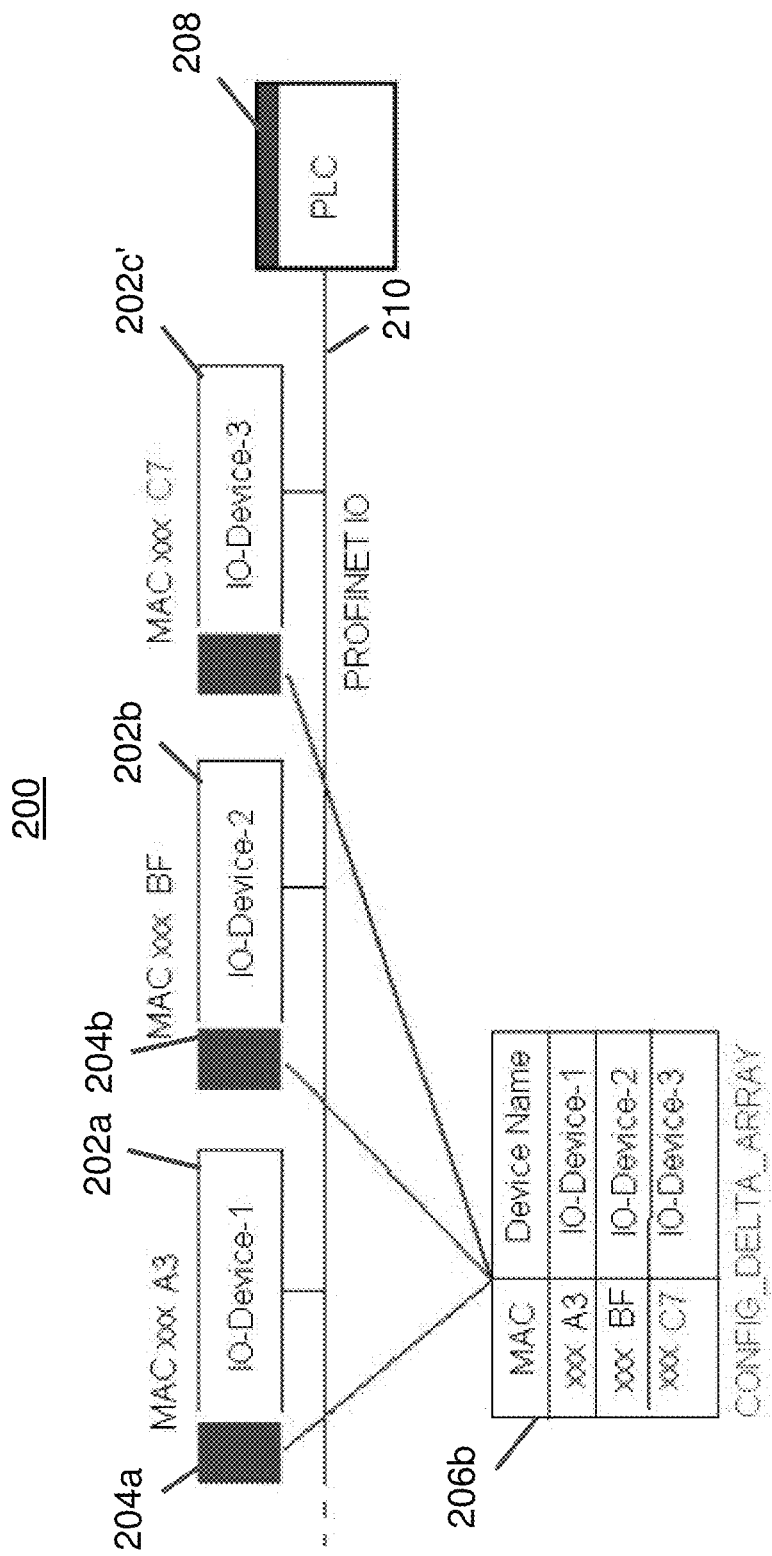

With regard to FIG. 2E, in response to each of the devices 202a and 202b receiving the "UPDATE" message 216 (see FIG. 2D), the devices 202a and 202b may update the respective configuration tables 206b, shown as CONFIG_DELTA_ARRAY, with the received "UPDATE" message 216 including the network address and device name. In an alternative embodiment, the "UPDATE" message 216 may include the entire updated configuration table 206b. Once the devices 202a and 202b update their respective configuration tables 206b, each of the nodes 202a, 202b, and 202c' store a common updated configuration table 206b such that each of the devices operating on the network 200 know the configuration of the entire network 200. The PLC 208 may also be configured to store the updated configuration table 206b for managing communications with the nodes on the network 200.

Figure 3:
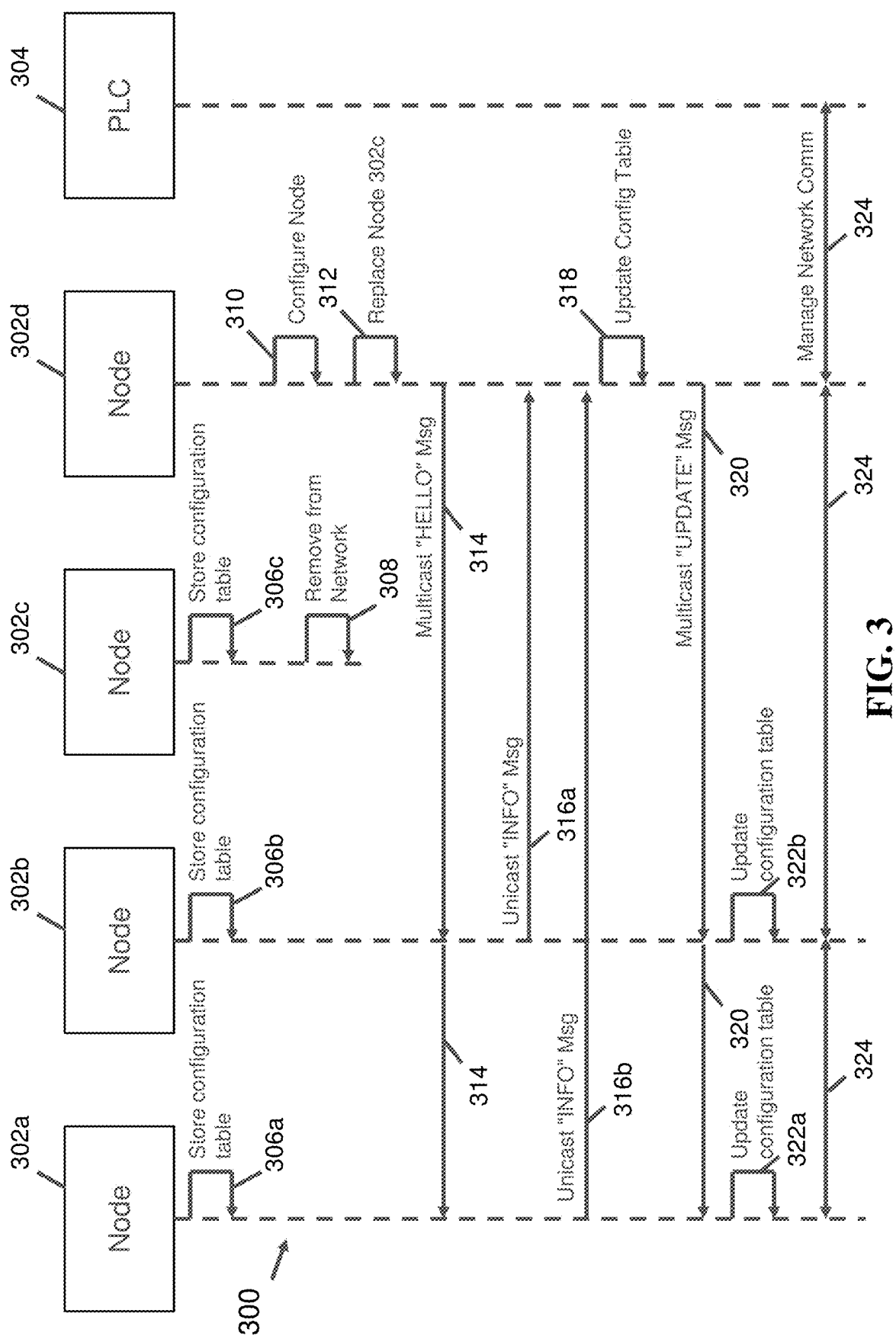
FIG. 3 is an interaction diagram inclusive of a process for replacing a node on an IEEE 802.3 network that summarizes the processes of FIGS. 2A-2E.

With regard to FIG. 3, an interaction diagram inclusive of a process 300 for replacing a node on an IEEE 802.3 network 300 that summarizes the processes of FIGS. 2A-2E is shown. The process 300 may include configuring and storing a configuration table (CONFIG_DELTA_ARRAY) on each of nodes 302a, 302b, and 302c at respective steps 306a, 306b, and 306c. At step 308, node 302c may be removed from the network. The removal may be a result of a failure of the node 302c or the operator deciding to remove the node 302c from the network. Other failure reasons and means of removal of the node may exist.

At step 310, the operator may configure a new node 302c' by establishing a network address and setting node name of the new node 302c' to "NULL," for example. At step 312, the operator may replace node 302c with node 302c' by establishing node 302c' to communicate with other nodes 302a and 302b on the network. In replacing the node 302c with node 302c', the network may be able to continue to operate as the replacement may be performed using the simple device replacement technique as described herein.

At step 314, node 302c' may communicate a multicast "HELLO" message to be sent to each of the nodes 302a and 302b operating on the network. The "HELLO" message may be communicated along with a network address and device name "NULL" assigned to the new node 302c'. In an embodiment, the multicast "HELLO" message may also be communicated to a PLC 304 also operating on the network. At steps 316a and 316b, nodes 302b and 302a may respectively communicate a unicast "INFO" message inclusive of a configuration table back to the node 302c'. At step 318, in response to receiving the "INFO" messages, the node 302c' may update its configuration table by (i) determining network addresses of the nodes 302a and 302b that sent the "INFO" messages from nodes 302a and 302b and (ii) determining which node, in this case node 302c, did not reply to the multicast "HELLO" message of step 314 by comparing node addresses and/or node names with respect to the configuration tables received from the nodes 302a and 302b in the "INFO" messages.

At step 320, the node 302c' may communicate a multicast "UPDATE" message to each of the nodes 302a and 302b with a difference table, which includes network address and node name of node 302c', or full configuration table, which includes a current configuration of the entire network inclusive of the new node 302c', to enable each of the nodes 302a and 302b to update their respective configuration tables at steps 322a and 322b. The multicast "UPDATE" message may also be communicated to the PLC 304 at step 320. At step 324, the network may continue to operate in a normal manner, where the PLC 304 may coordinate communications or operations of the nodes 302a, 302b, and 302c' operating on the network. It should be understood that the network operations may operate normally throughout the node replacement process 300. As previously described, the use of the configuration tables and difference tables may enable the nodes 302a-302c' to be replaced without the use of a controller computer, hardware, complex software, or Conformance Class B network communication protocol, as understood in the art.

It is noted that if the nodes on the network were not adopted to have a UBICOMP paradigm, then the simple device replacement feature may not be possible. The configuration table (CONFIG_DELTA_ARRAY) may be dynamically and autonomously shared and exchanged (i.e., without external intervention). Moreover, the configuration table cannot reside in a single node (e.g., IO Device), even with a server role because the single node may be unexpectedly removed and replaced in the future, which would cause the network configuration table to be lost.

Alternative Configurations

There are alternate, known solutions to providing for a device replacement. For example, an alternative is to have an SD card storing the whole configuration in each device, although not always cost effective. However, the use of an SD card might enable the use of only one SD card in a master device, and use the process for the others nodes (slaves), or just adopt Class B Profinet as a standard (more complex, but sometimes justifiable). The process may, in principle, also be used in non-profinet networks if the PLC is substituted with a master unit or if all nodes store the differential configurations, but more memory on each node is to be available.

Managing Bandwidth of a Network

As previously described, the use of multiple imaging devices and/or devices with other functionality that communicate large volumes of data utilizing best effort, low-priority traffic over an Ethernet network results in overall bandwidth reduction of the network, including a high-priority traffic. Without the use of a process similar to one described herein, use of multiple image readers or other devices that utilize high levels of low-priority communications on most popular industrial automation networks (e.g. Profinet-RT and Ethernet/IP), could be impossible in the future as devices with higher levels of low-priority communications continue to expand.

Fieldbus standards institutions, such as PI™ and ODVA®, that promote and regulate the use of various soft real-time Ethernet-based fieldbusses warn manufacturers of devices, such as imaging systems that generate high data volumes, from the indiscriminate use of the bandwidth on the network. In fact, the institutions specifically state, "it is recommended to analyze the data traffic" and to design good placement of the devices in the topology, so that the data stream generated impacts as little a part of the network as possible, which is generally referred to as being a "separate branch" approach.

Practically speaking, for Profinet-RT, it is stated: "[t]he network load generated by PROFINET should always be below 50%" (see Annex, PDF p. 97). Moreover, the standards institutions suggest the best effort traffic not to exceed 50% of 100 Mbps, meaning that if two imagers from 5 Mpixel (40 Mbps) belonging to a vision system simultaneously transmit on the network, the 50%-50% requirement can not be guaranteed for all available routes.

As a result, unless a Profinet IRT (the isochronous Conformance Class C or CC-C), which is expensive and complex, special attention is to be taken to avoid multiple devices that use a best effort data traffic when communicating on the fieldbus. Otherwise, an interference is manifested as an increase, not easy to quantify, in the difference between expected and real-time reaction to an event (response time).

As understood, time-jitter may become greater than the fixed cycle time of the PLC, which is not acceptable for a customer who decided to use a device, such as a vision system, with best effort data traffic communications. However, time-jitter problems may happen because in the absence of a mechanism for time division of communications over the network, such as those found in automation networks for motion control (e.g. EtherCAT and Profinet IRT), at certain moments traffic already injected into the network infrastructure (NICs, switches and routers) can become so large as to prevent physical access to the channel to other traffic.

A network management process, as further described herein, prevents, or at least contains within acceptable limits, influence of the best effort traffic on the real-time traffic without a need for action by a human operator or a central server arbitrage by utilizing a token ring approach.

More specifically, the process may introduce a special access to the bandwidth, generally considered a "critical resource," through a mechanism of priority access to network communications. In an embodiment, access to the network communications for transmission by devices may be limited to a device or node that currently has a token in a similar manner as provided by a token ring (IEEE 802.5). As understood, a token is cyclically exchanged between the nodes of the network, and nodes may be limited to communicating only when in possession of the token. As understood in the art, the token ring network mostly ceased to be used after the 1980's boom of Ethernet 802.3 communications protocol, which is incompatible with a token ring network.

Although the principles described herein utilize a token ring concept, the use of token ring functionality or a modified token ring, as described as a logical ring herein, within an Ethernet network enables nodes that use large amounts of low-priority traffic with a best effort configuration is possible without additional hardware and minimal operator effort.

Figure 4A:
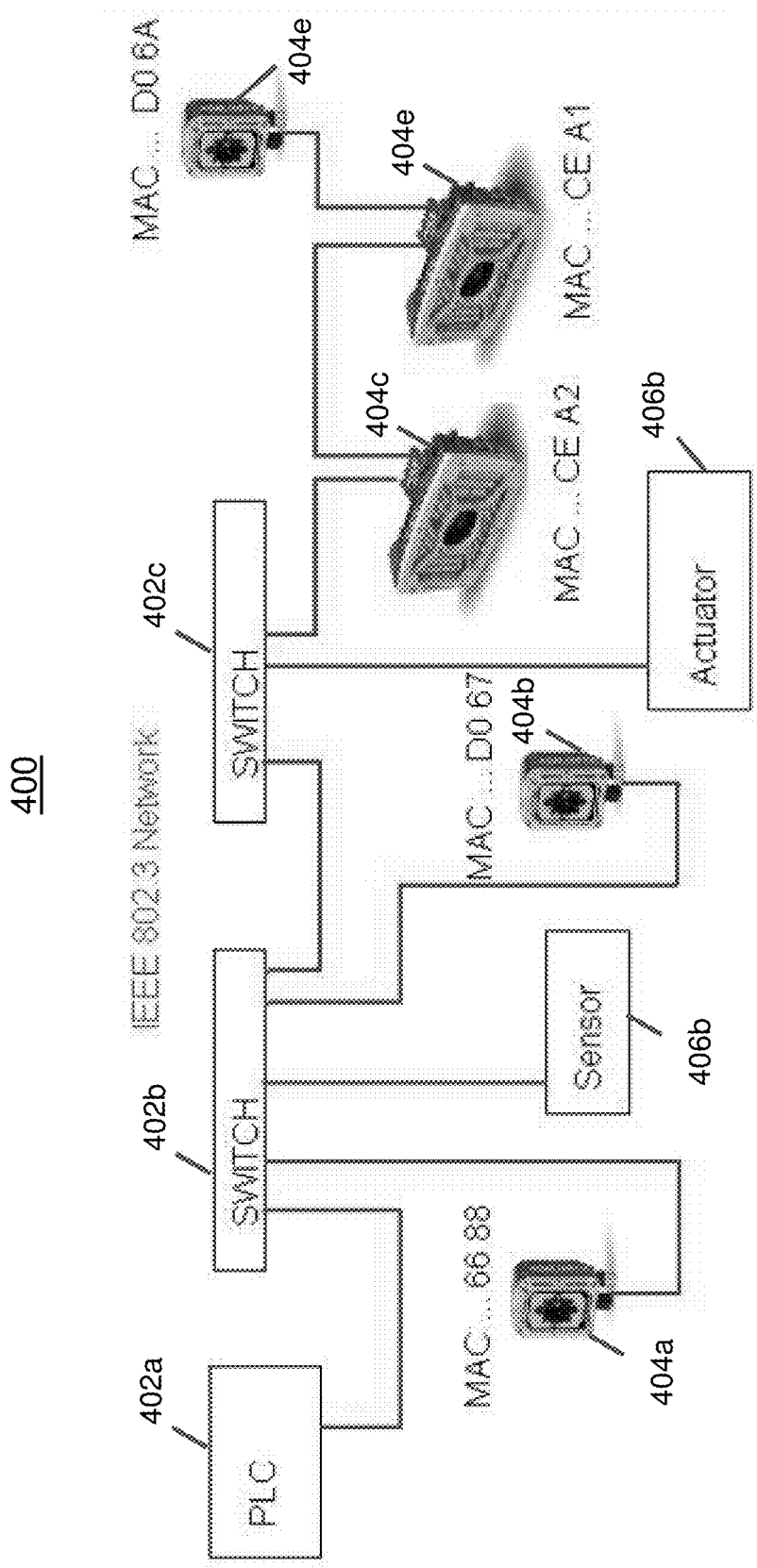
FIGS. 4A and 4B are illustrations of an illustrative IEEE 802.3 Ethernet network inclusive of multiple nodes that utilize low-priority traffic communications, and are configured to support logical ring processes to manage bandwidth of the low-priority traffic.
Figure 4B:
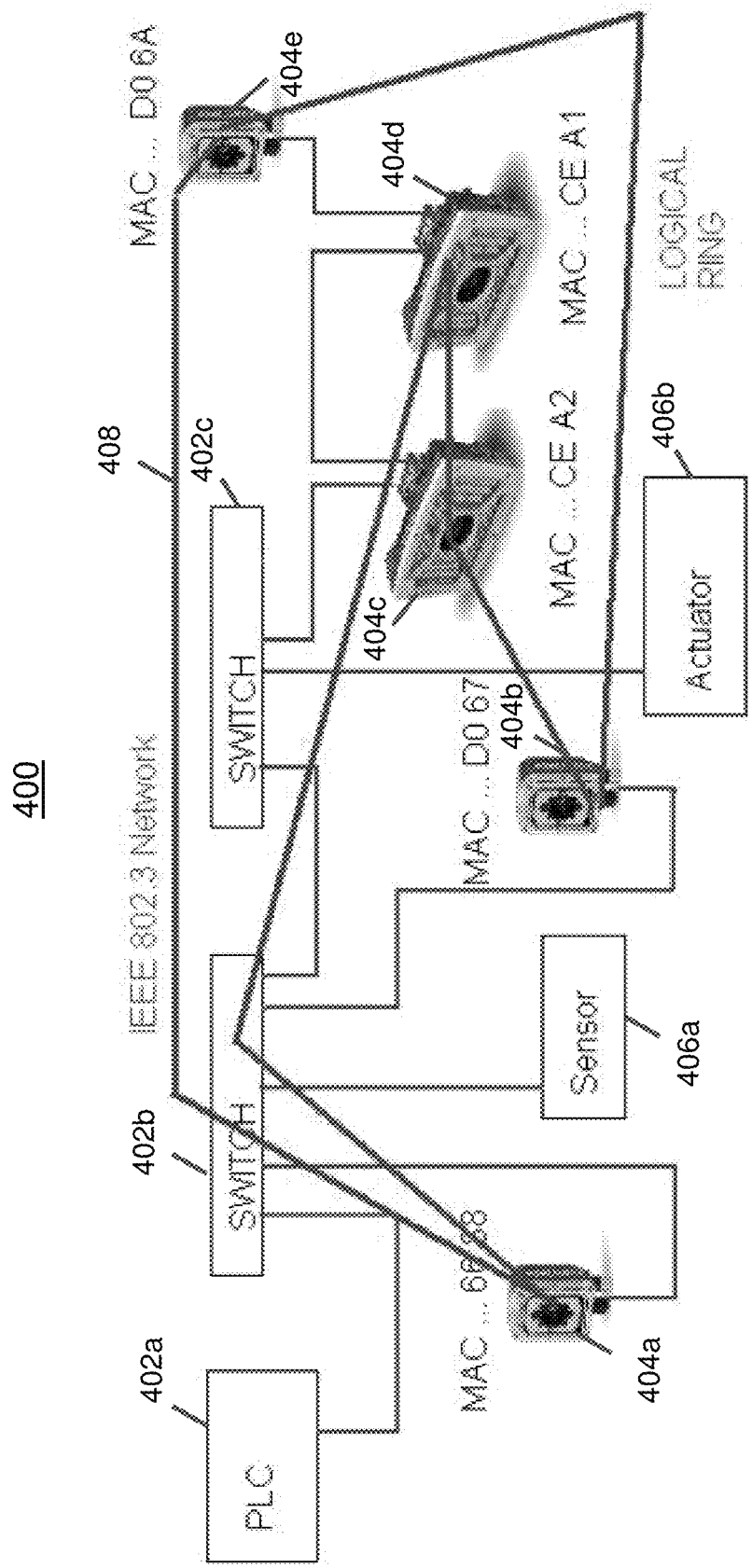

With regard to FIGS. 4A and 4B, illustrations of an illustrative IEEE 802.3 Ethernet network 400 inclusive of multiple network components 402a-402c (collectively 402) and nodes 404a-404e (collectively 404) that may utilize low and/or high priority communications are shown. A sensor 406a and actuator 406b, which are not considered to be nodes that produce low-priority traffic, are also operating on the network 400. The network components 402 may include a PLC 402a and switches 402b and 402c. Other network components may be provided to support nodes 404 on the network 400. The nodes 404 may include a variety of different devices, including imaging devices 404a, 404b, and 404e, and industrial equipment 404c and 404d. As shown, each of the nodes 404 may include unique network addresses, such as MAC addresses, as understood in the art, that are used for communicating information to and from the respective nodes 404. As provided hereinbelow, the network addresses may be used for conducting operations in support of a modified token ring function, as described in a process hereinbelow with regard to FIG. 5. As shown in FIG. 4B, a logical ring 408 is shown to logically connect nodes 404a, 404d, 404c, 404b, and 404e in a logically circular order. The nodes 404 of the logical ring 408 may be nodes 404 that are configured to communicate low-priority traffic on the network 400, for example.

To establish the logical ring 408, a process may be used to identify and configure the logical ring 408. The process may be performed, as follows:

Step 1

On power-on, each of the network nodes 404, such as a vision system, may present itself to each of the other nodes via a broadcast "HELLO" message. The "HELLO" message may include an associated network address so as to announce that network node to each of the other network nodes on the network 400 and to enable each of the network nodes 404 to populate a token data structure or token (UBICOMP_TOKEN) with each of the network addresses. As understood in the art, the IEEE 802.3 network 400 may have any topology with any number of nodes, and is typically configured with a mixture of a star and daisy-chain topologies. As the logical ring 408 may be dynamically and logically configured, physical layout may not be used in defining an order in the token.

Step 2

In an embodiment, a number of devices, such as a reader, scanner, or other vision system, does not need to be known in advance. When the network is initially turned on, each of the nodes 404 may wait for a predetermined time (e.g., 1 s) to collect responses to each of "HELLO" messages, after which each of the nodes 404 considers the modified token ring setup to be completed.

Additional nodes that arrive after the setup interval (e.g., 1 second) may be managed at a later time, which may be a plug-and-play approach, the same or similar to that described above (e.g., send "HELLO" message, receive responses, update token table). At this point, each of the nodes 404 may store a local copy of the same token data structure, which may be called an UBICOMP_TOKEN, to create an association between node addresses (e.g., MAC locations) in the virtual ring 408, such as, for example, (i) an increasing MAC order list, where the first entry may be the smallest, (ii) a scheduling, including which network node owns the token, (iii) number of activations, such as tokens actually used to transmit best effort traffic, and (iv) an amount of best effort data already sent by each node. A starting token is represented in an illustrative token data structure (UBICOMP_TOKEN) below in TABLE I in association with a first node having MAC address " . . . 66 88" along with a logical ring view (i.e., an ordering of the nodes 404, in this case MAC Addresses (i) . . . 66 88, (ii) . . . CE A1, (iii) . . . CE A2, (iv) . . . D0 67, (v) . . . D0 6A. It should be understood that a ring is formed by a process that after assigning a token active to a last node in the table, in this case a node with " . . . D0 6A" MAC address, that a next node to which a token active logical value is to be the first node in the table (i.e., MAC address " . . . 66 88").

TABLE I

UBICOMP_TOKEN: Initial Token
UBICOMP_TOKEN

| Global Token Activation Counter | MAC Address | Data Sent | Token Activation Counter | Token Active |
|---|---|---|---|---|
| 0 | . . . 66 88 | 0 | 0 | 1 |
|   | . . . CE A1 | 0 | 0 | 0 |
|   | . . . CE A2 | 0 | 0 | 0 |
|   | . . . D0 67 | 0 | 0 | 0 |
|   | . . . D0 6A | 0 | 0 | 0 |

Step 3

In each node, a software component, which may be called UBICOMP_ENGINE, may make the UBICOMP_TOKEN circulate between nodes in the scheduled order. In an embodiment, a scheduler may be decentralized so as to reside in each of the nodes 404, thereby preventing a token ring process from failing if the scheduler were stored in a single node that fails.

A node that has an active token may make the following actions:

1. send on the network its best-effort traffic (if any);
2. increase its TOKEN_ACTIVATION_COUNTER and DATA_SENT;
3. increase a GLOBAL_TOKEN_ACTIVATION_COUNTER;
4. reset a TOKEN_ACTIVE parameter, and set a next node's TOKEN_ACTIVE parameter; and
5. broadcast the UBICOMP_TOKEN to each of the other nodes 404 on the network, and not just to the next network node in the logical ring 408 as performed in conventional token rings.

For example, a token that is going to be sent to a fourth node may be represented as shown in TABLE II:

TABLE II

UBICOMP_TOKEN: Updated Token after 3 Nodes
UBICOMP_TOKEN

| Global Token Activation Counter | MAC Address | Data Sent | Token Activation Counter | Token Active |
|---|---|---|---|---|
| 3 | . . . 66 88 | 0.2 MB | 1 | 0 |
|   | . . . CE A1 | 10 KB | 1 | 0 |
|   | . . . CE A2 | 1 MB | 1 | 0 |
|   | . . . D0 67 | 0 | 0 | 1 |
|   | . . . D0 6A | 0 | 0 | 0 |

By sending the token to each of the nodes 404 and not just to the next scheduled node as conventionally performed, a more robust network results by avoiding the token being lost due to a node with the token being removed from the network or otherwise disabled. In an embodiment, each of the nodes 404 that receives the token may start a TIMER (e.g., a 1 second timer) that defines a maximum time slot given to the node that currently has the token active. At the end of the timer (i.e., when the timer reaches a final time that may be pre-established based on application of use, for example), a next node takes control of the token, thereby enabling that node to exclusive communicate on the network.

Step 4

The UBICOMP_ENGINE can implement special policies for best effort traffic on the individual nodes 404. For example, one policy may prevent a node from transmitting more than a certain amount of data as compared to the other nodes to maintain balance the traffic in relation to the topology. Another policy may include preventing a node from transmitting too frequently as compared to the other nodes. A variety of other policies may be employed to manage communications, both high and low priority traffic, along with token control and processing.

The UBICOMP_ENGINE is to handle a case in which a node disappears from the network due to failure of a node, an unplugging of a cable (and then maybe reappears), or other node disruption, a new node replacing an existing node, and so on. Below are example cases in which a token may be lost or in which there are different tokens on the network.

(i) For each node that is added to the network, each UBICOMP_ENGINE, a response to receiving the "HELLO" message, may add a new entry (e.g., a new row) to its UBICOMP_TOKEN;

(ii) If a node disappears from the network before receiving UBICOMP_TOKEN or while the node holds the token, then the TIMER mechanism being executed on each of the other nodes may be activated (i.e., time-out detected), and a next scheduled node takes possession of the token automatically, removing an entry (e.g., row) of the disconnected node, performing any processes while in possession of the token, and distributing the token to the rest of the nodes on the network with the removed entry for the disconnected node; and (iii) Each time a node receives a new token (as in the early stages of disconnection and reconnection of a node), a comparison of the received node may be made with an existing token, and a selection of the new token or updated content therein may be made. That is, selection may be made based on a highest value of the GLOBAL_TOKEN_ACTIVATION_COUNTER.

It should be understood that precision of latency time may have a relatively wide range (e.g., thread level: typical 1 ms) for service of receiving and transmitting the token because determinism is not a constraint when best-effort traffic is being communicated. However, a calculation may be made as to how long a token takes to circulate around the logical ring 408 to make sure the logical ring 408 is compatible with application requirements of the best effort service (e.g., image saving or remote decoding).

Round-trip time of a token may depend on size and a number of network nodes to be crossed along the logical ring 408. The following illustrative terms, equations, and values may be utilized in performing the calculation:

Tmin=minimum round-trip of the frame that carries the token;

Tmax=maximum round-trip of the frame that carries the token;

N=number of stations across a logical ring (also nodes that do not belong to a vision system, for example);

Tf=length of the frame that carries the token at 100 Mbps (with 32 nodes in the vision system and UBICOMP_TOKEN 32*20=640 bytes=51 us approximately);

Tswitch=latency in the switch (store and forward type), about 10 us;

Tcable=propagation time through a cable with a maximum length (100 m)=0.5 us;

Tfmax=maximum length of Ethernet frames over which the Token have to wait at each node (1518 bytes 100 Mbps)=123 us;

Then, given the following illustrative formulas:

$$Tmin=N*(Tcable+Tswitch)+Tf=N*(0.5\ us+10\ us)+51\ us;$$

$$Tmax=Tmin+(N-1)*(Tfmax+Tswitch)=Tmin+(N-1)*(123+10)\ us$$

The following TABLE III may be derived according to the number N of nodes to cross, which are not necessarily all nodes of a vision system, for example.

Even in the worst case, when the token has to wait for the serialization of an entire Ethernet frame of maximum length (1518 byte) on each crossed node, the maximum time for delivery is within values that are perfectly acceptable (less than 5 ms) for best effort traffic time and negligible compared to the typical time required for FTP large data transfers.

TABLE III

| Data Transfer Rates | | |
| --- | --- | --- |
| N | Tmin μs | Tmax μs |
| 2 | 72 | 205 |
| 4 | 93 | 492 |
| 8 | 135 | 1066 |
| 16 | 219 | 2214 |
| 32 | 387 | 4510 |

It has to be noted that in case a node should transmit a large image (e.g. 5 Mpixel), it is not necessary to send the entire image during activation of a single Token. As an example, image data may transmit in 10 token activations, which corresponds to 10 ring loops, without a customer losing functionality, and, at the same time, making more efficient use of network bandwidth.

From a user point of view, receiving an image after 500 ms (estimated value for 5 MB bitmap on a 100 Mbps network via FTP) rather than (500+10*Tmax) is generally not a problem or even noticeable.

In summary, a process that combines a token ring approach with a UBICOMP paradigm in order to prevent real-time performance drop of the Industrial Ethernet when multiple low-priority traffic devices, such as Image Readers, are running on the network may be utilized to ensure that each of the nodes on the network are able to communicate low-priority traffic without reducing operates of high-priority traffic. More specifically, the processes described herein allows for multiple image readers operating as a distributed vision system to transmit (at unpredictable times) large amounts of data over a Fast Ethernet network (10/100 Mbps), such as Profinet-RT, Ethernet/IP, and Datalogic EBC, without interfering significantly with the normal operations and performances of the other connected devices (e.g., PLC with various sensors and actuators). Such functionality may be achieved by logically mapping a token ring approach (TR) into a generic topology, not necessarily a loop, along with a ubiquitous computing (UBICOMP) environment, and configuring each of the nodes in the logical ring to perform token ring functionality, as further described with regard to FIG. 5.

Figure 5:
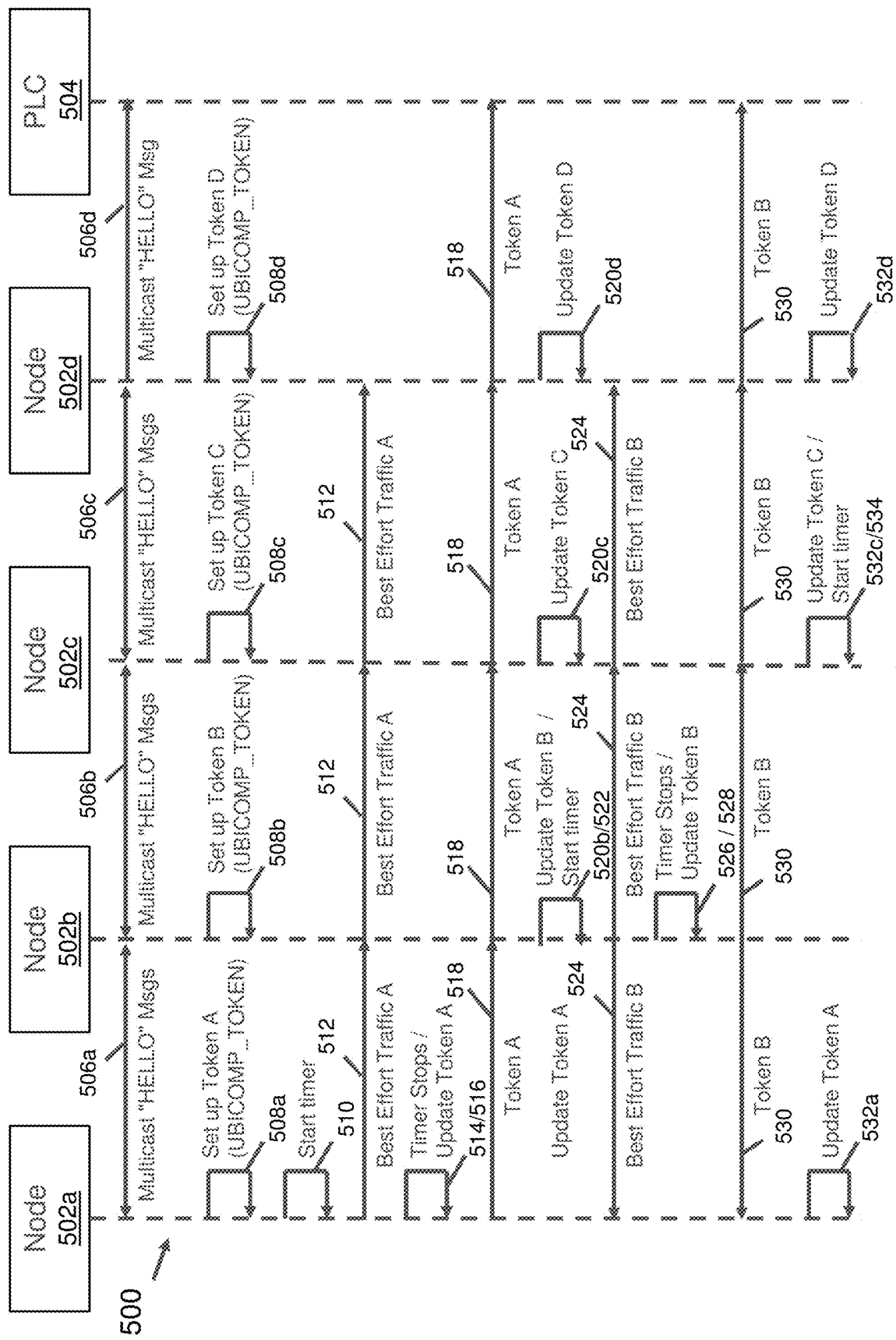
FIG. 5 is an interaction diagram inclusive of a process for supporting an IEEE 802.3 Ethernet network to support one or more low-bandwidth nodes without reducing high-priority traffic.

With regard to FIG. 5, an interaction diagram inclusive of a process 500 for supporting an IEEE 802.3 Ethernet network with multiple, low-priority traffic nodes 502a-502d (collectively 502) without reducing high-priority traffic is shown. The nodes 502 and a PLC 504 are used to perform the process 500. The nodes 502 may include a variety of different devices that utilize low-priority traffic, such as an imaging device that captures 2D image data. To initiate the process 500, each of the nodes 502 may broadcast a notification message, such as a multicast "HELLO" message, at steps 506a-506d (collectively 506). At steps 508a-508d (collectively 508), each of the nodes 502 may set up respective tokens (UBICOMP_TOKEN). The tokens may be data structures that (i) logically define a logical ring (e.g., includes an ordered list of network addresses (e.g., MAC addresses)), and (ii) include data that may be used by the nodes 502 to limit low-priority traffic communications to a node that has a logical token and manage logical possession of the logical token.

At step 510, node 502a may start a timer. The timer may be a pre-defined amount of time, such as 1 second, during which the node 502a may communicate low-priority or best effort traffic A at step 512. At step 514, in response to the timer stopping, the node 502a may update its token A. In updating the token A, a variety of parameters may be updated, including resetting a token active value, increasing a token activation counter, increasing an amount of data sent at step 512, and increasing a global token activation counter. It should be understood that the names and number of parameters that are updated may be varied, but resetting and setting token active values to enable the logical ring to advance and track which node currently has logical possession of the token is to be performed. At step 518, the node 502*a* may communicate the updated token A to each of the other nodes 502*b*-502*d*. In addition, the token may be communicated to the PLC 504. Each of the other nodes 502*b*-502*d* may receive the updated token A and update respective tokens at steps 520*b*-520*d* to include the data in the data structure (token). In an embodiment, the nodes 502*b*-502*d* may replace the entirety of the data in the respective tokens. Alternatively, the nodes 502*b*-502*d* may replace only updates to the token data structure made by the node 502*a*.

At step 522, the node 502*b* may start a timer during which the node 502*b* may communicate best effort traffic B data over the Ethernet network at step 524. While the timer of node 502*b* has not reached a final value (i.e., the timer has not stopped), best effort traffic B may be communicated over the Ethernet at step 524. In response to the timer stopping (i.e., reaching a final time) at step 526, the node 502*b* may update token B at step 528. In updating token B, node 502*b* may reset its token activation value and turn on a token activation value of a next ordered node, in this case node 502*c*. Thereafter, the node 502*b* may perform a multicast communication of the token B at step 530. At steps 532*a*, 532*c*, and 532*d*, each of the respective nodes 502*a*, 502*c*, and 502*d* may update their tokens. At step 534, node 502*c* may start its timer. The process 500 may continue thereafter in a similar manner in the logical ring. It is noted that each of the nodes 502 contains their own token, thereby eliminating a problem if one of the nodes 502 becomes disabled or goes off-line from the network when in logical possession the token. Although not shown, when one of the nodes initiates a timer, one or more of the other nodes may initiate respective timers, thereby ensuring that a single node does not captivate a token as a next node may also monitor timing of a token and identify a times out condition.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A method for replacing a peer node on an Ethernet network, the method comprising:
   providing a plurality of nodes configured to communicate with each other as peers on the Ethernet network over a peer-to-peer networking communication protocol;
   storing a network address and a node name associated with each node in a configuration table by each node of the Ethernet network;
   communicating, by a new node added to the network as a peer with the plurality of nodes, a notification message onto the network to enable each of the nodes on the network to receive the notification message;
   receiving, by the new node from each of the other nodes on the network that received the notification message, a response message to the notification message, the response messages including respective configuration tables;
   determining, by the new node, which node the new node has replaced by identifying an identifier associated with the replaced node that is missing from a set of node identifiers listed in at least one configuration table received in the response messages;
   populating a configuration table by the new node, the configuration table including (i) each of the network addresses and node names of the nodes that responded to the notification message, and (ii) a network address and a node name of the new node, wherein the node name of the new node is the same as the node name of the replaced node as determined from the configuration tables received from its peer nodes on the Ethernet network; and
   communicating, by the new node, an update message to each of the network nodes that sent a response message to enable each of the network nodes to update respective configuration tables being stored thereat to replace at least the network address of the replaced node with the network address of the new node.

2. The method according to claim 1, wherein communicating a notification message includes communicating a multicast message.

3. The method according to claim 1, wherein receiving a response message includes receiving a unicast message.

4. The method according to claim 3, wherein receiving the unicast message includes receiving an entire CONFIG_DELTA_ARRAY table.

5. The method according to claim 1, wherein populating includes:
   determining which network address is missing; and
   replacing the missing network address with a network address in the configuration table in association with a node name associated with the missing network address to form an updated configuration table.

6. The method according to claim 1, wherein populating includes storing a configuration table received in a response message.

7. The method according to claim 1, wherein communicating the notification message causes the configuration table stored by each node on the network to be automatically communicated by each node that receives the notification message.

8. The method according to claim 1, wherein communicating the updated message includes automatically communicating the update message by the new node.

9. The method according to claim 1, further comprising naming the new node with a temporary name prior to being renamed with the same node name of the replaced node as determined from the configuration tables received from its peer nodes on the Ethernet network.

10. An Ethernet-enabled node, comprising:
    a memory unit;
    an input/output (I/O) unit configured to communicate over an Ethernet network; and
    a processing unit in communication with the memory unit and the I/O unit, and configured to:
       store a network address and a node name of the network-enabled node;
       communicate, by a new node added to the network, a notification message onto the Ethernet network to enable each other peer node on the network to receive the notification message, the notification message including a network address of the Ethernet-enabled node;
       receive, from each of the other nodes on the network that received the notification message, a response message, the respective response messages including a configuration table and network address from each of the nodes on the network;
       determine which node the Ethernet-enabled node has replaced by identifying an identifier associated with a node missing from the response messages based on at least one configuration table received in the response messages;
       populate a configuration table including (i) each of the network addresses and node names of the nodes that responded to the response message, and (ii) a network address and a node name of the new node, wherein the node name of the new node is the same as the node name of the replaced node as determined from the at least one configuration table received from its peer nodes on the Ethernet network; and
       communicate an update message to each of the network nodes that sent a response message to enable each of the network nodes to update respective configuration tables being stored thereat to replace at least the network address of the replaced node with the network address of the new node.

11. The Ethernet-enabled node according to claim 10, wherein the notification message is a multicast message.

12. The Ethernet-enabled node according to claim 10, wherein the response message is a unicast message.

13. The Ethernet-enabled node according to claim 12, wherein the unicast message includes an entire CONFIG_DELTA_ARRAY table.

14. The Ethernet-enabled node according to claim 10, wherein the processing unit, in populating a configuration table, is further configured to:
    determine which network address is missing; and
    replace the missing network address with a network address in the configuration table in association with a node name associated with the missing node to form an updated configuration table.

15. The Ethernet-enabled node according to claim 10, wherein the processing unit, in populating the configuration table, is configured to store a configuration table received in a response message.

16. The Ethernet-enabled node according to claim 10, wherein the notification message causes the configuration table stored by each node on the network to be automatically communicated by each node that receives the notification message.

17. The Ethernet-enabled node according to claim 10, wherein the processing unit, in communicating the update message, is further configured to automatically communicate the updated message.

18. The Ethernet-enabled node according to claim 10, wherein the processing unit is further configured to name the new node with a temporary name prior to being renamed with the same node name of the replaced node as determined from the configuration tables received from its peer nodes on the Ethernet network.

19. The Ethernet-enabled device according to claim 18, wherein the temporary name is a known default name used for nodes when newly connected to the Ethernet network.

20. The Ethernet-enabled node according to claim 10, further comprising a Conformance Class A (CCA) device that includes the memory unit, the I/O unit, and the processing unit.

21. The Ethernet-enabled node according to claim 20, wherein the CCA device is a scanner.

22. The Ethernet-enabled node according to claim 10, wherein the Ethernet network is an IEEE 802.3 communications network.

23. The Ethernet-enabled node according to claim 10, wherein the memory unit includes an SD card.

24. The Ethernet-enabled node according to claim 10, wherein the network addresses are media access control (MAC) addresses.

25. An industrial Ethernet communications system having a dynamic network reconfiguration procedure, the system comprising:
- an IO controller;
- a plurality of nodes operably coupled with each other and the IO controller over an industrial network, each node configured to communicate with each other utilizing a peer-to-peer networking communication protocol, and having a configuration table stored thereon including at least a network address and a node name for each network-enabled node connected to the industrial network; and
- a replacement node operably coupled with the network and configured to:
  send a notification message onto the industrial network including a network address of the replacement node informing the other peer nodes on the network of the presence of the replacement node;
  receive a response message from each of the other nodes on the industrial network that received the notification message, the respective response messages including the configuration table stored by the respective nodes;
  determine a replaced node based on which node did not respond to the notification message by identifying an identifier that is missing from a set of node identifiers listed in at least one configuration table received in the response messages;
  populate a configuration table stored within the replacement node including (i) each of the network addresses and node names of the nodes that responded to the notification message and (ii) a network address and a node of the replacement node, wherein the node name of the replacement node is set as the node name corresponding to the replaced node that did not respond to the notification message as determined from the at least one configuration tables received from its peer nodes on the industrial network; and
  send an update message to each of the remaining nodes connected to the industrial network to update respective configuration tables being stored thereat with the network address of the replacement node replacing the network address of the replaced node.

26. The communications system according to claim 25, wherein the IO controller is a programmable logic controller (PLC) configured to maintain communications over a communication bus of the industrial network.

27. The communications system according to claim 25, wherein the IO controller is configured to send configuration parameters to the replacement node based on the node name of the replacement node being the same as the replaced node.

28. The communications system according to claim 25, wherein the notification message is a multicast message, each response message is a unicast message, and the update message is a multicast message.

29. The communications system according to claim 25, wherein the configuration table stored by each of the plurality of nodes is a difference configuration table relative to a known default table.

30. The communications system according to claim 25, wherein the replacement node and the plurality of nodes are configured to perform the dynamic network reconfiguration procedure during operation of the industrial network.

31. The communications system according to claim 25, wherein the plurality of nodes include one or more computers, scanners, printers, robots, sensors, or any combination thereof.

32. The communications system according to claim 25, wherein the plurality of nodes include Conformance Class A (CCA) devices of a IEEE 802.3 communications network.

33. The communications system according to claim 25, wherein the replacement node is initially associated with a known default node name prior to being replaced by the node name of the replaced node.

* * * * *